Oct. 10, 1967     H. NEUHAUS     3,346,737
HYDRAULICALLY CONTROLLABLE SPECTROSCOPIC SLIT APPARATUS FOR
MAKING PRECISION ADJUSTMENTS OF THE SLIT WIDTH
Filed Sept. 22, 1964

INVENTOR.
HERMANN NEUHAUS
BY
ATTORNEY

United States Patent Office 3,346,737
Patented Oct. 10, 1967

3,346,737
HYDRAULICALLY CONTROLLABLE SPECTROSCOPIC SLIT APPARATUS FOR MAKING PRECISION ADJUSTMENTS OF THE SLIT WIDTH
Hermann Neuhaus, Montrose, Calif., assignor to Applied Research Laboratories, Inc., Glendale, Calif., a corporation of Delaware
Filed Sept. 22, 1964, Ser. No. 398,342
5 Claims. (Cl. 250—105)

This invention relates to a novel remote adustment mechanism for adjusting the spacing between a pair of slit jaws in spectroscopic apparatus of the type such as used in X-ray spectroscopy wherein the slit jaws are movable over a path of considerable length, and may be inaccessible during operation of the apparatus.

Especially in X-ray spectroscopy, a pair of jaws defining a slit are commonly arranged to be movable along a focal circle for sequentially detecting X-rays of successive different wave lengths. Due to the nature of the spectrum and to the changing distance between the slit and the sources of the X-rays being detected, the sensitivity and resolution of the apparatus tend to vary over relatively wide ranges unless the width of the slit is varied as the slit is moved along the focal circle. Heretofore, apparatus has been available including movable slit jaws and cam arrangements for moving the jaws toward and away from each other as the slit is moved along the focal circle. Such arrangements have been relatively expensive and have been subject to certain disadvantages, among which are the need to provide separate cams for each different program, and the need to disrupt the operation of the apparatus whenever it is desired to change the cams.

Accordingly, one important object of the present invention is to provide a novel slit adjustment means for adjusting the slit width in spectroscopic apparatus.

Another object is to provide novel adjustment mechanism for accurately, smoothly, and controllably adjusting the slit width in spectroscopic apparatus during operation of the apparatus even though the slit may be in motion and inaccessible.

The foregoing and other objects and advantages of the invention will become apparent in the following detailed description of a presently preferred embodiment thereof, taken in conjunction with the drawing, wherein.

Figure 1:
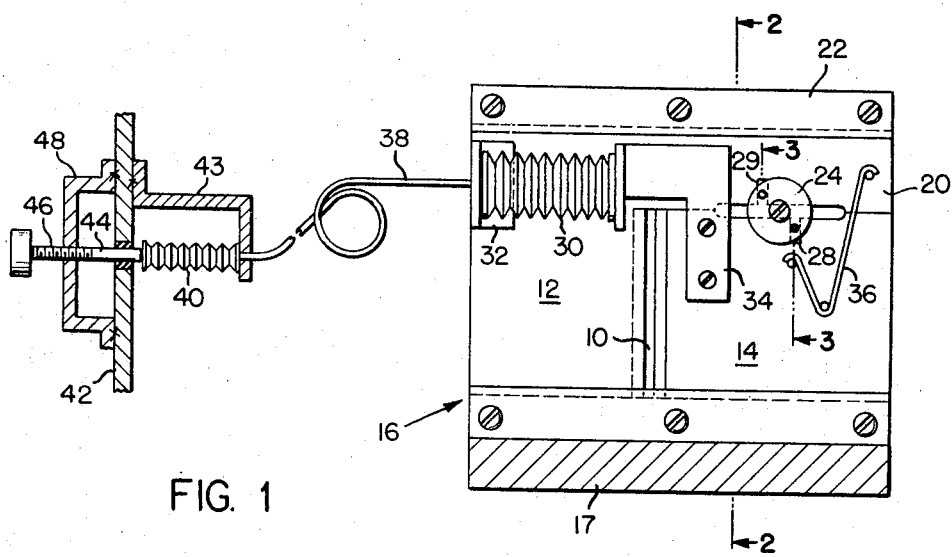
FIGURE 1 is a partly schematic diagram, illustrating a set of adjustable slit jaws according to the present invention.
Figure 2:
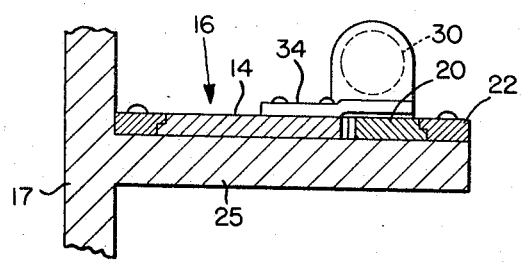
FIGURE 2 is a cross-sectional view taken along the line 2—2 of FIGURE 1.
Figure 3:
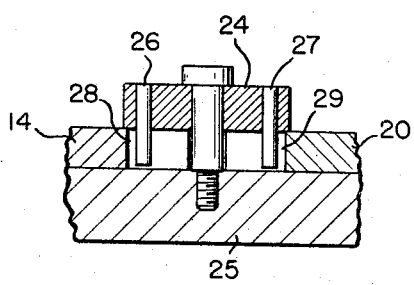
FIGURE 3 is a cross-sectional view taken along the line 3—3 of FIGURE 1.

Briefly, the invention contemplates use of a sealed hydraulic system including a first liquid filled bellows mounted in a fixed position and arranged for manual actuation, a second liquid filled bellows mounted adjacent to the slit jaws and connected to them for moving them apart and together, and a flexible tube connecting the two bellows. The fixed bellows is biased, as by precompression, toward expansion, and the slit mounted bellows is biased toward contraction. A drive device is provided for controllably compressing the fixed bellows thereby to overcome the biasing forces and expand the slit mounted bellows. The cross section of the fixed bellows is small relative to the slit mounted bellows so that small adjustments of the slit width may be made easily and accurately.

Referring now to the drawing, the slit 10 is defined by the space between a pair of jaws 12 and 14, which are mounted in juxtaposed position and slidable toward and away from each other upon a guideway 16. The guideway is mounted upon a carriage 17 or other support (shown only fragmentarily) for travel in the spectroscopic apparatus. The jaws 12 and 14 are interconnected by any convenient arrangement to maintain them always symmetrically disposed relative to a fixed register position on the guideway 16. As shown, one jaw 12 is L-shaped, and includes an integral arm 20 which extends across one end of the second jaw 14, between the second jaw 14 and the gib 22 of the guideway. A lever 24 is pivoted on the base 25 of the guideway and carries a pair of pins 26 and 27 at its opposite ends, which fit snugly but slidably in respective slots 28 and 29 in the jaws 12 and 14. Motion of one jaw 12 in one direction rotates the lever 24 to produce equal and opposite motion of the other jaw 14, and vice versa.

A first bellows 30 called the slit bellows is mounted between the two jaws 12 and 14, being connected thereto by respective brackets 32 and 34. A biasing spring 36 is mounted between the two jaws 12 and 14 for urging the jaws 12 and 14 together, that is, in the direction to compress the bellows 30. The bellows 30 is connected through a flexible tube 38 of relatively small diameter to a second bellows 40, which is mounted in fixed position upon any convenient support. As shown, the fixed bellows 40 is mounted adjacent to an external wall 42 of the housing within which the slit operates. One end of the bellows 40 is fixed to an L-shaped bracket 43, which projects from the wall 42 into the housing. The free, or movable end of the bellows 40 faces the wall 42, and is abuttingly engaged by the extended shaft 44 of a screw 46. The shaft 44 is slidably sealed through the wall 42 to allow operation during times when the housing is evacuated or filled with a special atmosphere. The screw 46 is threaded in a nut 48, which is fixed on an external bracket 49 on the housing wall 42. Preferably, the screw 46 is a calibrated device such as for example, a micrometer screw, so that its advance may be accurately indicated.

The fixed bellows 40 is of resilient metal construction, and is biased toward expansion by precompression. Its expansion and contraction are controlled by operation of the screw 46, which works against the precompression force. When the screw 46 is advanced, the bellows 40 is compressed, and liquid is forced out of it into the tube 38, and liquid from the tube 38 is forced into the slit bellows 30 causing it to expand and drive the jaws 12 and 14 farther apart. When the screw 46 is withdrawn, the fixed bellows 40 expands in response to its precompression, admitting fluid from the tube 38 and permitting the slit bellows 30 to be compressed by the biasing spring 36.

The cross section of the fixed bellows 40 is preferably made as small as can conveniently be done, and the cross section of the slit bellows 30 as large as convenient in order to achieve a large control ratio factor, i.e., to require a large travel of the control screw 46 to produce a small change in the width of the slit 10. In the usual X-ray spectrometer utilization, the maximum slit width is on the order of only about one-tenth inch, and accurate and precise adjustment is important.

With the arrangement of the present invention, it has been found possible to adjust the slit 10 smoothly, precisely, and accurately, whereby the operator of the spectroscopic apparatus is enabled to adjust the slit to its optimum width at any time, and to change the adjustment at will.

The liquid within the hydraulic system, including the bellows 30 and 40 and the tube 38, is preferably selected from among those that have relatively small thermal expansion characteristics. Mercury may be used to advantage. Ethylene glycol is presently preferred, however, because of its lower cost and because it presents little danger to operating personnel in the event of leakage or bursting of the bellows.

What is claimed is:

1. In spectroscopic apparatus of the type including a pair of jaws defining a slit, the jaws being movable relative to each other to vary the width of the slit, mechanism for moving the jaws relative to each other comprising a first hydraulic bellows, means connecting said bellows to the jaws for moving them alternately apart and together responsive to expansion and contraction of said bellows, a second hydraulic bellows, a tube connecting said first and second bellows, biasing means for yieldably compressing said first bellows, and means for controllably compressing said second bellows.

2. An adjustment mechanism for controllably varying the spacing between a pair of jaws in spectroscopic apparatus, thereby to vary the width of the slit defined by the jaws, the jaws being movable alternately toward and away from each other, said mechanism comprising a first bellows, means connected between said bellows and the jaws for moving the jaws relatively to each other in response to alternate expansion and contraction of said bellows, a second bellows, a tube connecting said first and second bellows, a liquid filling said bellows and said tube, biasing means for yieldably compressing said first bellows, and means for controllably compressing said second bellows, thereby to expand said first bellows against the urging of said biasing means.

3. An adjustable slit mechanism for use in spectroscopic apparatus comprising a pair of juxtaposed jaws defining a spectroscopic slit between them, means mounting said jaws for relative limited motion toward and away from each other, and a drive arrangement for controlling motion of said jaws from a location spaced from them, said arrangement comprising a closed hydraulic system including a first bellows connected to said jaws for driving them apart, a second bellows spaced from said first bellows, a hydraulic line connecting said bellows, a liquid filling both of said bellows and said line, biasing means for yieldably compressing said first bellows, and control means for forcibly compressing said second bellows.

4. In spectroscopic apparatus of the type including a pair of jaws defining a slit, means mounting the jaws for travel together and for limited motion toward and away from each other, and a housing, the jaws being mounted for travel within the housing, slit adjustment mechanism for moving the jaws relative to each other comprising a first hydraulic bellows, means connecting said bellows to the jaws for alternately moving the jaws towards and away from each other, a second hydraulic bellows, means mounting said second bellows in a fixed position relative to the housing, a flexible tube connecting said first and second bellows to each other, biasing means for yieldably compressing said first bellows and for yieldably expanding said second bellows, and drive means for controllably compressing said second bellows, said drive means being actuatable from a position outside of the housing.

5. In spectroscopic apparatus of the type including a pair of jaws defining a slit, means mounting the jaws for travel together and for limited motion toward and away from each other, and a housing, the jaws being mounted for travel within the housing, slit adjustment mechanism for moving the jaws relative to each other comprising a first hydraulic bellows, means connecting said bellows to the jaws for alternately moving the jaws towards and away from each other, a second hydraulic bellows, means mounting said second bellows in a fixed position relative to the housing, a flexible tube connecting said first and second bellows to each other, biasing means for yieldably compressing said first bellows and for yieldably expanding said second bellows, and drive means for controllably compressing said second bellows, said drive means being actuatable from a position outside of the housing, said second bellows having a smaller cross section than said first bellows whereby a given motion of said second bellows produces a smaller motion of said first bellows.

References Cited

UNITED STATES PATENTS

| | | | |
|---|---|---|---|
| 530,486 | 12/1894 | Jenson | 95—54 |
| 1,102,278 | 7/1914 | Lipp | 95—54 |
| 1,835,902 | 12/1931 | Rommel | 95—54 |
| 3,099,747 | 6/1963 | Thomas et al. | 260—105 |

RALPH G. NILSON, *Primary Examiner.*

A. L. BIRCH, *Assistant Examiner.*